(12) United States Patent
Huei

(10) Patent No.: US 6,987,681 B1
(45) Date of Patent: Jan. 17, 2006

(54) PICKING AND SUPPLYING CIRCUIT FOR DISCHARGING DIRECT CURRENT

(76) Inventor: Lin Min Huei, 15 Fl.-2, No. 177, Daye Rd., Taichung City (TW) 40848

( * ) Notice: Subject to any disclaimer, the term of this patent is extended or adjusted under 35 U.S.C. 154(b) by 0 days.

(21) Appl. No.: 11/035,961

(22) Filed: Jan. 18, 2005

(51) Int. Cl.
*H02M 7/00* (2006.01)

(52) U.S. Cl. ..................................... 363/125

(58) Field of Classification Search ................. 363/44, 363/52, 125, 127
See application file for complete search history.

(56) References Cited

U.S. PATENT DOCUMENTS 5,587,895 A * 12/1996 Harkins ....................... 363/89
5,898,584 A * 4/1999 Feng ........................ 363/125
6,026,005 A * 2/2000 Abdoulin ..................... 363/89

* cited by examiner

*Primary Examiner*—Adolf Berhane
(74) *Attorney, Agent, or Firm*—Dennison, Schultz, Dougherty & MacDonald

(57) ABSTRACT

The present invention provides a kind of Picking and Supplying Circuit for Discharging Direct Current, which is connected with supplying line of alternating current of electrical loading in series. It contains a picking part with a control triac under a closing state, for picking the alternating current of specified volume; a commutation and voltage regulating loop, which has two pairs of diodes connected reversely in series each other, and one diode with certain voltage is connected between a pair of diodes connected in series for commutating the picked alternating current and regulating voltage and discharging the direct current; a trigger loop was designed for connecting commutation and voltage regulating loop and providing a reverse sign to make the control triac convert into an unobstructed state from the closing one and making the alternating current reply and recover the supply of the electrical loading.

3 Claims, 3 Drawing Sheets

PICKING AND SUPPLYING CIRCUIT FOR DISCHARGING DIRECT CURRENT

FIELD OF THE PRESENT INVENTION

The present invention provides a kind of Picking and Supplying Circuit for Discharging Direct Current, relating to wall controller of electrical appliance.

BACKGROUND OF THE INVENTION

Based on some investigation, the case of U.S. Pat. No. 5,898,584 patent for invention indicates the techniques for a kind of Circuit supplying power to ceiling fan. Before this patent, it was composed of cathode half-loop, anode half-loop, control loop and protective loop etc. four units for discharging direct current of proper intensity by picking proper alternating current via the cathode and anode half-loop. However for the limitation from the design of half-loops, for the loading of different intensities, a low loading control loop and a high loading control loop is designed respectively to control the control loop, so that the stable and reliable output of direct current. Although the NMOS in the control loop has an advantage in fast response, it would run away with a lot of electricity.

Thus, based on the general techniques the former patent indicates, it will consume a lot of alternating current before discharging direct current resulting in negative electric loading from the alternating current and lacking current, and affecting its service life indirectly and bringing some opposite effects on effective application of energy sources obviously.

SUMMARY OF THE INVENTION

Therefore, the purpose of the present invention is to provide a kind of Picking and Supplying Circuit for Discharging Direct Current, which consumes a low current and discharges stable direct current under the circumstances that it would not affect the required current intensity of the former electrical loading. It is used for the wall controller.

For the above purposes, the present invention provides a kind of Picking and Supplying Circuit for Discharging Direct Current, which is connected with supplying line of alternating current of electrical loading in series. It contains a picking part with a control triac under a closing state, for picking the alternating current of specified volume; a commutation and voltage regulating loop, which has two pairs of diodes connected reversely in series each other, and one diode with certain voltage is connected between a pair of diodes connected in series for commutating the picked alternating current and regulating voltage and discharging the direct current; a trigger loop was designed for connecting commutation and voltage regulating loop and providing a reverse sign to make the control triac convert into an unobstructed state from the closing one and making the alternating current reply and recover the supply of the electrical loading.

Thereinafter, hereby describe further that by means of illustrating practical invention and drawings, in which:

DETAILED DESCRIPTION OF THE PREFERRED EMBODIMENT

Figure 1:
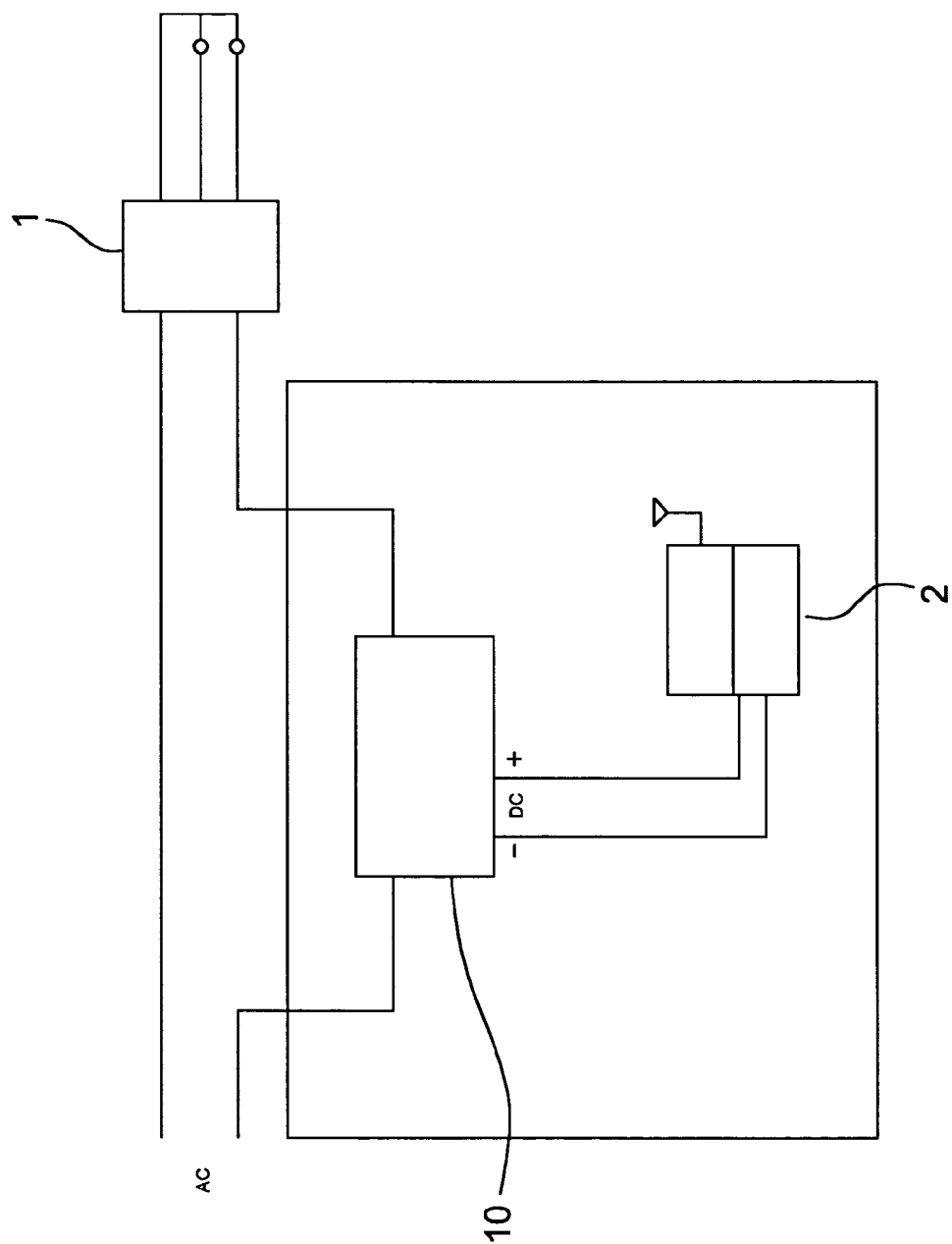
FIG. 1 is the sketch map of series connection of an embodiment of the present invention.
Figure 2:
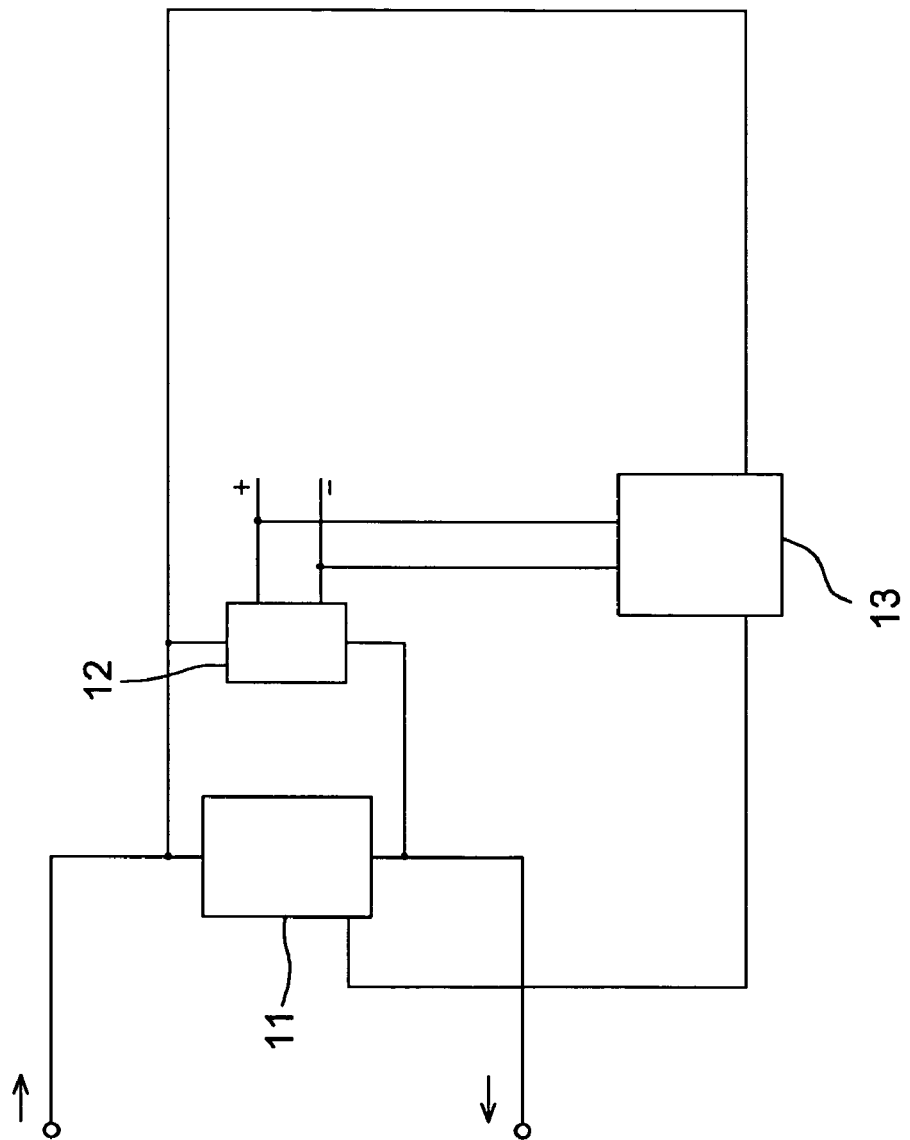
FIG. 2 is the flow chart of an embodiment of the present invention.
Figure 3:
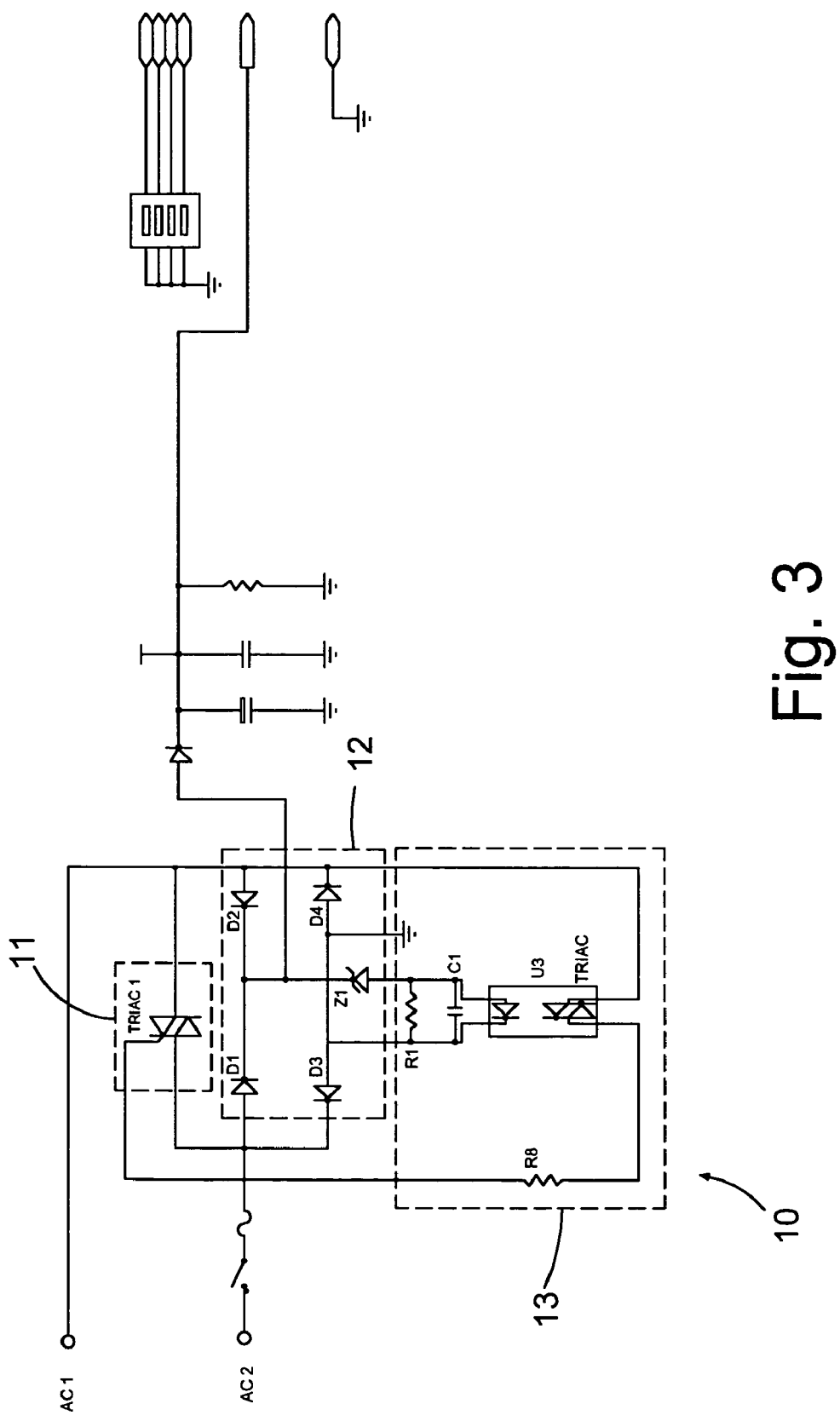
FIG. 3 is circuit diagram of an embodiment of the present invention.

As shown in all figures, the present invention provides a kind of Picking and Supplying Circuit for Discharging Direct Current (10), which is meeting the demand of telecontrol wall controller (2) for discharging and supplying direct current for electrical loading (1). It is connected with supplying line of alternating current of electrical loading in series for picking alternating current of low volume for driving the telecontrol wall controller (2).

This Picking and Supplying Circuit for Discharging Direct Current (10) is composed of a picking part (11), a commutation and voltage regulating loop (12) and a trigger loop (13).

The picking part (11) takes the trielectrode AC switch (TRIAC1) as its control triac, and is connected with the supplying circuitry of alternating current for electrical loading with lines.

The commutation and voltage regulating loop (12), which has two pairs of diodes ((D1 and D2) and (D3 and D4)) connected reversely in series each other, and one diode (Z1) with certain voltage is connected between a pair of diodes (D1 and D2) connected in series for limiting that only the current above the specified magnitude of voltage can be discharged after the commutation, so that the discharged voltage can be within the range of stable voltage.

The trigger loop (13) is connected with another end of diode (Z1) and another pair of commutation diodes (D3 and D4), joined with resistance (R1 and R8) and capacitance (C1). And it has a trigger unit (U3) which is used for providing a reverse sign to make the control triac convert into an unobstructed state from the closing one.

Based on the above structure, for its operation, the TRAIC1 is under the closing state while this Picking and Supplying Circuit for Discharging Direct Current (10) connects with the switch (SW1) of external alternating current to make the alternating current be picked and put into the commutation and voltage regulating loop (12), further be commutated as direct current of proper intensity for discharging current to outside for meeting the demands of telecontrol controller (2). Afterwards, the trigger loop (13) immediately provides a reverse sign to make the TRAIC1 through via resistance (R8) with the bidirectional TRAIC in the interior of photocoupler of trigger unit (U3), and make the alternating current via the switch (SW1) back into the supplying loop for driving electrical loading. At this time, pressure drop at the two ends of TRAIC1 is about 2–3V, which can be ignored comparing with the former electrical loading driving. It would not affect the service life of electrical loading and using state.

Hereupon, please refer to the comparison on test data between this present invention and former patent listed in the Appendix, based on the indication of data, it may be confirmed that the present invention has the characteristics in low consumption for electricity and large volume of direct current. Additionally, the whole circuit structure would make the techniques easier than the ones of former patent, in another word, the present invention can realize good efficacy with its more simplified technique than the former patent. Generally speaking, the present invention is qualified patent what you describe, which has advanced and perfect invention; besides, the techniques the prevent invention describes are not the conditions to limit the application of the present invention, if some equivalent components and some changes of circuit for this kind of components, that should be within the range of techniques of the present invention. And it is not one and only application method for the present invention that to apply this invention to supply power for telecontrol controller.

What is claimed is:

1. A kind of Picking and Supplying Circuit for Discharging Direct Current, which is connected with supplying line of alternating current of electrical loading in series, which includes:

a picking part with a control triac under a closing state, for picking the alternating current of specified volume;

a commutation and voltage regulating loop, which having two pairs of diodes connected reversely in series each other, and one diode with certain voltage being connected between a pair of diodes connected in series for commutating the picked alternating current and regulating voltage and discharging the direct current; and a trigger loop designed for connecting commutation and voltage regulating loop and providing a reverse sign to make the control triac convert into an unobstructed state from the closing one and making the alternating current reply and recovering the supply of the electrical loading.

2. The Picking and Supplying Circuit for Discharging Direct Current as claimed in claim 1, in which the TRIAC is a Trielectrode AC Switch.

3. The Picking and Supplying Circuit for Discharging Direct Current as claimed in claim 1, in which the diode for voltage is Zener diode.

* * * * *